United States Patent [19]

Blount

[11] 4,292,214

[45] Sep. 29, 1981

[54] PROCESS FOR THE PRODUCTION OF POLYURETHANE PRODUCTS

[76] Inventor: David H. Blount, 5450 Lea St., San Diego, Calif. 92105

[21] Appl. No.: 182,997

[22] Filed: Sep. 2, 1980

Related U.S. Application Data

[63] Continuation-in-part of Ser. No. 13,139, Feb. 21, 1979, Pat. No. 4,226,982.

[51] Int. Cl.$^3$ .............................................. C08L 97/02
[52] U.S. Cl. ........................................260/9; 260/17.5
[58] Field of Search ................ 260/17.4 CL, 9, 17.5; 521/84, 175; 528/44, 85

[56] References Cited

U.S. PATENT DOCUMENTS

| | | | |
|---|---|---|---|
| 3,870,665 | 3/1975 | Diehr | 260/9 |
| 4,153,764 | 5/1979 | Blount | 521/172 |
| 4,220,757 | 9/1980 | Blount | 521/155 |
| 4,226,982 | 10/1980 | Blount | 536/101 |

*Primary Examiner*—Paul R. Michl

[57] ABSTRACT

Polyurethane resinous and foam products are produced by reacting lignin-cellulose polyepoxy resins with polyisocyanates.

31 Claims, No Drawings

PROCESS FOR THE PRODUCTION OF POLYURETHANE PRODUCTS

CROSS-REFERENCE TO RELATED APPLICATIONS

This Application is a continuation-in-part of U.S. pat. application No. 013,139, filed Feb. 21, 1979 now U.S. Pat. No. 4,226,982 issue Oct. 7, 1980.

SUMMARY OF THE INVENTION

This invention relates to the production of polyurethane resinous and foam products by reacting a polyisocyanate or isocyanateterminated polyurethane prepolymer with a lignin-cellulose polyepoxy resin which is produced by reacting an epoxide compound with a broken-down alkali metal plant polymer, such as produced by the process outlined in U.S. patent application No. 013,139, filed Feb. 21, 1979 now U.S. Pat. No. 4,226,982 issue Oct. 7, 1980 by David H. Blount, M.D., and is incorporated into this Application.

While a variety of polyurethane resinous and foam products have been produced for a number of diverse applications, none have the unique properties possessed by the compounds of this invention. The polyurethane products produced by the process of this invention have many uses, for instance, as a molding material, as an adhesive, as a filler, as a prepolymer, as a foam useful for thermal and sound insulation, as coating agents on wood, metal, concrete and plastics, as a soil conditioner and for use in laminates and the production of further compounds.

The primary object of the present invention is to produce polyurethane resinous and foamed products. Another object is to produce polyurethane resinous and foamed products which are relatively inexpensive, are useful and are novel products. A still further object is to produce a polyurethane foamed product which may be used for thermal and sound insulation.

Any suitable modifying or additive compounds may be used in the reactions of this invention to vary properties of the products. Typical additives include halohydrins, aldehydes, polyhydroxy compounds, dicarboxylic anhydrides, polysulfide polymers, alkali polysulfides, aminoplasts, phenoplasts, fatty or rosin acids, furfuralketone resins, dibutyl phthalate, tricresyl phosphate, polyamides, fatty diamines, alicyclic anhydrides, aminoplast silicates, phenoplast silicates, alkali metal polysulfide silicates, phenoplast silicates, acrylic silicates, acrylic monomers, vinyl acetate, acrylonitrile and resin extenders such as alpha-methyl styrene, mineral oil, coal tar, paraffin oil, sulphonated castor oil and mixtures thereof. The polyepoxy resins may be modified to contain free hydroxyl groups by adding aldehydes, halohydrins, mono-epoxide compounds, e.g., alkylene oxides, tetrahydrofuran, styrene oxides, polyhydroxy compounds and mixtures thereof.

The lignin-cellulose polyepoxy resins may be modified to contain polyisocyanate catalysts by adding amines such as tertiary amines or tertiary amines which contain hydrogen atoms which are reactive with isocyanate groups, e.g., triethanolamine, triisopanolamine, etc.

The lignin-cellulose polyepoxy resins contain hydroxyl radicals, carboxyl radicals and epoxy radicals which can be reacted with the isocyanate radical of polyisocyanates or isocyanate-terminated polyurethane prepolymers.

Any suitable organic amine may be used as the polymerizing agent; however, polyamines are preferred.

The polyamines to be used in this invention include those organic materials possessing a plurality of amino hydrogen, e.g., a plurality of:

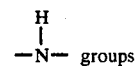 groups wherein N is an amino nitrogen. These include the aliphatic, cycloaliphatic, aromatic or heterocyclic polyamines as well as derivatives thereof as long as the derivatives still contain the necessary amino hydrogen.

Suitable examples of these materials include, among others, the aliphatic polyamines such as, for example, ethylenediamine; diethylenetriamine; triethylenetetramine; tetraethylenepentamine; 1,4-diaminobutane; 1,3-diaminobutane; hexamethylenediamine; 3-(N-isopropylamine) propylamine; N,N'-diethyl-1,3-propanediamine; hexapropyleneheptamine; penta(1-methyl-propylene) hexamine; tri(1,2,2-trimethylethylene) tetramine; tetra(1,3-dimethylpropylene) pentamine; penta(1,5-dimethylamylene) hexamine; penta(1,2-dimethyl-1-isopropylethylene) hexamine; and N,N'-dibutyl-1,6-hexanediamine.

Suitable aliphatic polyamines are the alkylene polyamines of the formula:

$$N_2H(RNH)_nH$$

wherein R is an alkylene radical or a hydrogen-substituted alkylene radical, and n is an integer of at least one, there being no upper limit to the number of alkylene groups in the molecule.

The aliphatic polyamines are preferred which comprise the polyethylene polyamines of the formula:

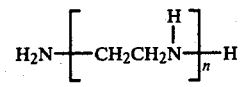

wherein n is an integer varying from about 2 to 8. A mixture of high-molecular-weight polyethylene polyamines and diethylenetriamine is especially preferred.

Suitable polyamines include polymeric polyamines, such as may be obtained by polymerizing or copolymerizing unsaturated amines, such as allyl amine or diallyl amine, alone or with other ethylenically unsaturated compounds. Alternatively, such polymeric products may also be obtained by forming of copolymers having groups reactive with amines such as, for example, aldehyde groups, as present on acrolein and methacrolein polymers, and reacting these materials with monomeric amines to form the new polymeric polyamines. Polymeric amines can also be formed by preparing polymers containing ester groups, such as, for example, a copolymer of octadecene-1 and methylacrylate, and then reacting this with a polyamine so as to effect an exchange of an ester group for an amide group and leave the other amine group or groups free. Polymers of this type are described in U.S. Pat. No. 2,912,416.

Suitable polyamines include the polyamines possessing cycloaliphatic ring or rings, such as, for example:

1-cyclohexylamine-3-aminopropane;
1,4-diaminocyclohexane;
1,3-diaminocyclopentane;
di(aminocyclohexyl) methane;
di(aminocyclohexyl) sulfone;
1,3-di(aminocyclohexyl) propane;
2,4-diaminocyclohexane;
N,N'-diethyl-1,4-diaminocyclohexane; and the like.

Preferred members of this group comprise those polyamines having at least one amino or alkyl-substituted amino group attached directly to a cycloaliphatic ring containing 5 to 7 carbon atoms.

Other suitable polyamines comprise the aminoalkyl-substituted aromatic compounds such as, for example, di(aminoethyl) benzene, di(aminomethyl) benzene, tri(aminoethyl)benzene, tri(aminobutyl) naphthalene and the like.

Suitable polyamines also include the organo-metallic compounds, such as those having a silicon on boron atom or atoms linked to amino or substituted-amino groups. The compounds may also be those organo-metallic compounds wherein the amino group or substitutedamino groups are attached to carbon, such as in the alkosilylpropylamines like triethoxysilylpropylamines.

Other suitable polyamines include the N(aminoalkyl) piperazines, such as, for example, N-aminobutylpiperazine; N-aminoisopropyl-3-butoxypiperazine; N-aminoethylpiperazine; 2,5-dibutyl-N-aminoethylpiperazine; 2,5-dioctyl-N-aminoisobutylpiperazine; and the like.

Another group of suitable materials is obtained by reacting the above-described polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, epichlorohydrin, 1,2-dicylene oxide, glycidyl acetate, glycidyl, benzoate, glycidyl propionate, glycidyl acrylate, glycidyl methyl maleate, glycidyl stearate, glycidyl oleate, butyl 1,2epoxypropionate and the like. This reaction between polyamines and monoepoxide is effected merely by bringing the components together in proper proportions. The adducts are obtained when a mol of the polyamine is reacted with not more than one mol of monoepoxide. The excess amine can be retained or can be removed by distillation. Examples of the monoepoxidepolyamine reaction products include, among others, N(hydroxypropyl) diethylenetriamine (reaction product of propylene oxide and diethylenetriamine), and N(2-hydroxy-3-phenoxypropyl) diethylenetriamine (reaction product of phenyl glycidyl ether and diethylenetriamine).

A group of related materials are those soluble fusible products obtained by reacting a polyepoxide with a monoamine. Examples of polyepoxides that may be used include any of the present invention. Examples of monoamines include any of those noted above for use in the compositions of the present invention. Examples of the monoamines include, among others, secondary amines such as dimethylamine, diethylamine, dipropylamine, dibutylamine, di(tert-butyl) amine, dinonylamine, dicyclohexylamine, diallylamine, dibenzylamine, methylethylamine, ethylcyclohexylamine, and the like. This reaction between the polyepoxides and monoamines is effected by merely bringing the components together in proper proportions. The desired soluble fusible products are obtained when the polyepoxide and nonoamine are combined so as to have at least 1.5 mols of the amine per epoxide equivalent of the polyepoxide.

Other examples include the soluble reaction products of polyepoxides and polyamines and salts thereof, such as described in U.S. Pat. Nos. 2,640,037 and 2,643,239.

Still other derivatives that may be employed include those obtained by reacting the polyamines with acrylates, such as methyl acrylate, ethyl acrylate, methyl methacrylates and the like. In this case, there is an exchange of the ester linkage for an amide linkage, one of the polyamine nitrogen being involved in the said amide linkage.

Another suitable group of derivatives that may be used in the process of the invention includes those soluble and fusible products obtained by reacting the polyamines noted above with unsaturated nitriles, such as acrylonitrile. Examples of such products include the cyanoethylated diethylenetriamine, cyanoethylated triethylenetetramine, cyanoethylated hexamethylenediamine, cyanoethylated 1,3-propanediamine and cyanoethylated 1,3-diaminocyclohexane. Preferred species of the cyanoalkylated polyamines include those of the formula:

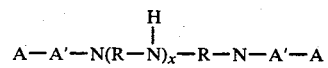

wherein x represents an integer in the range of 0 through 3 and A and A' represent a member selected from the group consisting of hydrogen and cyanoethyl radicals, and further characterized by the fact that the amine has at least one cyanoethyl group and at least one non-tertiary amino group in the molecule. The preferred members of this group comprise the cyanoethylated aliphatic and cycloaliphatic polyamines containing up to 18 carbon atoms.

Other suitable materials include the imidazoline compounds as prepared by reacting monocarboxylic acids with polyamines. These may be represented by the formula:

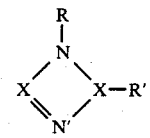

wherein X is an organic radical and, preferably, an alkylene radical, R is a long-chain hydrocarbon radical and, preferably, one containing at least 12 carbon atoms, and R is an organic radical containing an amine or amine-substituted group. Particularly preferred members of this group are those obtained by reacting any of the above-described polyamines with long-chain monocarboxylic acids, such as those containing at least 12 and, preferably, 16 to 30 carbon atoms, such as, for example, palmitic acid, pentadeconoic acid, 4-ketomyristic acid, 8,10-dibromostearic acid, margaric acid, stearic acid, alphachlorostearic acid, linoleic acid, oleic acid, dehydroxystearic acid, arachidic acid, cluopanodonic acid, behenic acid, lignoceric acid, cerotic acid, montanic acid, melissic acid, and the like, and mixtures thereof. These imidazolines are prepared by heating the polyamine with the monocarboxylic acid and removing the water formed by the reaction. The acid and polyamine are combined in an equivalent ratio varying from about 0.3 to 0.7 to 1, and, preferably, about 0.3 to 0.5 to 1. The temperature employed preferably varies from about 100° C. to 250° C.

Suitable polyamines include the aromatic polyamines, especially those having at least two —NH$_2$ groups attached to aromatic ring or rings and containing up to 25 carbon atoms.

Suitable polyamines include the sulfur- and/or phosphorouscontaining polyamines such as may be obtained by reacting a mercaptan- or phosphine-containing active hydrogen with an epoxy halide to form a halohydrin, dihydrochlorinating and then reacting the resulting compound with a polyamine. N-(3-ethylthio-2-hydropropyl) diethylenetriamine may be prepared, for example, by reacting ethyl mercaptan with epichlorohydrin, dihydrochlorinating and then reacting the resulting epoxy compound with diethylenetriamine. Suitable examples of such compounds include, among others:

N-(3-butylthio-2-hydroxypropyl) triethylenetetramine;
N-(4-phenylthio-3-hydrobutyl) pentamethylenetetramine;
N-(4-cyclohexylthio-3-hydrobutyl) ethylenediamine;
N-(3-cyclohexylthio-2-hydropropyl) hexamethylenediamine;
N-(3-diphenylphosphino-2-hydroxypropyl) triethylenetetramine;
N-(3-dicyclohexylphosphine-2-hydroxylpropyl) pentamethylenetetramine;
N-(3-dididecylphosphino-2-hydroxyhexyl) diethylenetriamine; and
N-(3-allylthio-2-hydroxypropyl) hexamethylenediamine.

The N-(allylthio-hydroxyallyl) aliphatic and aromatic polyamines, the N-(cycloalkylthiohydroxy-alkyl) aliphatic and aromatic polyamines and the N-(arylthiohydroxyalkyl) aliphatic and aromatic polyamines may also be used in this invention. Preferred phosphorus-containing curing agents include the N-(dialkylphosphinohydroxyalkyl) aliphatic and aromatic polyamines, the N-(dicycloalkyl phosphinohydroxyalkyl) aliphatic and aromatic polyamines and the N-(diaryl-phosphinohydroxyalkyl) aliphatic and aromatic polyamines.

Suitable polyamines include the polyamines of the formula:

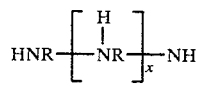

wherein x is an integer of 0 to 10 and R is a bivalent aliphatic or cycloaliphatic hydrocarbon radical containing from 1 to 10 carbon atoms, and derivatives obtained by reacting the aforedescribed polyamines with monoepoxides containing from 2 to 10 carbon atoms, ethylenically-unsaturated mononitriles containing 1 to 6 carbon atoms and monocarboxylic acid containing up to 20 carbon atoms.

Salts of polyamines and fatty acid (e.g., stearic, linoleic acid, decanoic acid, lauric acid, oleic acids and the like) may be used in this invention.

Aminoplasts, phenoplasts, aminoplast silicates, phenoplast silicates, aminosilicate compounds, and mixtures either with each other or with other curing agents, may be used as curing agents. These types of curing agent usually require curing at high temperatures and, in some cases, a small amount of an acid catalyst.

Suitable organic polyhydroxyl compound may be added with the polyfunctional epoxy compound (Component A) to produce a lignincellulose polyepoxy resin. Suitable polyhydroxyl compounds include di(monohydroxyl) alkanes, poly(mono-hydroxyl) alkanes and di(monohydroxyaryl) alkanes. Other examples of hydroxy-containing compounds are resorcinol, hydroquinone glycols, glycerol and mixtures thereof. Best results are obtained when using bisphenol-A, [2,2-(4-bishydroxyl-phenyl)-propane] in the preparation of the lignincellulose polyepoxy resin.

Typical di(monohydroxyaryl) alkanes are:
2,2'-bis(3,5-dibromo-4-hydroxy-phenyl) propane;
2,2'-bis(3,5-dichloro-4-hydroxy-phenyl) propane;
(4,4'-dihydroxy-diphenyl) methane;
2,2'-(4-bis-hydroxy phenyl) propane;
1,1'-(4,4'-dihydroxy-diphenyl) cyclohexane;
1,1'-(4,4'-dihydroxy-3,3'-dimethyl-diphenyl) cyclohexane;
1,1'-(2,2'-dihydroxy-4,4'-dimethyl-diphenyl) butane;
2,2'-(2,2'-dihydroxy-4,4'-di-tert-butyl-diphenyl) propane;
1,1'-(4,4'-dihydroxy-diphenyl)-1-phenyl-ethane;
2,2'-(4,4'-dihydroxy-diphenyl) butane;
2,2'-(4,4'-dihydroxy-diphenyl) pentane;
3,3'-(4,4'-dihydroxydiphenyl) pentane;
2,2'-(4,4'-dihydroxy-diphenyl) hexane;
3,3'-(4,4'-dihydroxy-diphenyl) hexane;
2,2'-(4,4'-dihydroxy-diphenyl)-4-methyl-pentane(-dihydroxy-diphenyl)heptane;
4,4'-(4,4'-dihydroxy-diphenyl) heptane;
2,2'-(4,4'-dihydroxy-diphenyl) tridecane;
2,2'-(4,4'-dihydroxy-3'-methyl-diphenyl) propane;
2,2'-(4,4'-dihydroxy-3-methyl-isopropyl-diphenyl) butane;
2,2'-(3,5,3',5'-tetra-chloro-4,4'-dihydroxy-diphenyl) propane;
2,2'-(3,5,3',5'-tetrabromo-4,4'-dihydroxy-diphenyl) propane;
(3,3'-dichloro-4,4'-dihydroxy-diphenyl) methane;
(2,2'-dihydroxy-5,5'-difluoro-diphenyl) methane;
(4,4'-dihydroxy-diphenyl) phenyl-methane; and
1,1'-(4,4'-dihydroxy-diphenyl)-1-phenyl-ethane; and mixtures thereof.

The poly(monohydroxy) alkanes are preferred to be polyols (organic polyhydroxyl compounds), in particular, compounds and/or polymers which contain from 2 to 8 hydroxyl groups, especially those with a molecular weight of from 80 to about 10,000 and, preferably, from 1,000 to about 6,000, e.g., polyesters, polyethers, polythioethers, polyacetals, polycarbonates, or polyester amides containing at least 2, generally from 2 to 8, but, preferably, from 2 to 4 hydroxyl groups. Compounds which contain amino groups, thiol groups or carboxyl groups may be used. Polyhydroxyl compounds (polyols) which already contain urethane or urea groups, modified or unmodified natural polyols, e.g., castor oil, carbohydrates and starches, may also be used. Additional products of alkylene oxides with phenolformaldehyde resins or urea-formaldehyde resins are also suitable for the purpose of the invention. Polybutadiene polymers with free hydroxyl groups, polysulfide polymers, polybutadienestyrene copolymers and butadiene-acrylontrile copolymer chains are also suitable for the purpose of the invention.

The hydroxyl-group-containing polyesters (polyols) may be, for example, reaction products of polyhydric alcohols, preferably dihydric alcohols and polybasic, preferably dibasic, carboxylic acids. The corresponding polycarboxylic acid anhydride or corresponding polycarboxylic acid esters of lower alcohols or their mixture may be used instead of the free polycarboxylic acids for preparing the polyesters. The polycarboxylic acid may be aliphatic, cycloaliphatic, aromatic and/or heterocyclic and may be substituted, e.g., with halogen atoms or may be unsaturated. Examples include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, fumaric acid, dimeric and trimeric fatty acids such as oleic acid, optionally mixed with monomer of fatty acids, dimethylterephthalate and bis-glycol terephthalate. Any suitable polyhydric alcohol (polyol) may be used, such as, for example, ethylene glycol; propylene-1,2- and -1,3-glycol; butylene-1,4- and -2,3-glycol; hexane-1,6-diol; octane-1,8-diol; neopentyl glycol; cyclohexanedimethol (1,4-bis-hydroxymethylcyclohexane); 2-methyl-propane-1,3-diol; glycerol; trimethylol propane; hexane-1,2,3-triol; butane-1,2,4-triol; trimethylol ethane; pentaerythritol; quinitol; mannitol; sorbitol; glucose; starches; fructose; cane sugar; dextrines, castor oil; methylglycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones such as ε-caprolactone, or hydroxycarboxylic acids such as ω-hydroxycaproic acid may also be used.

The polyethers with at least 2, generally from 2 to 8, and, preferably, 2 or 3 hydroxyl groups, used according to the invention, are known and may be prepared by the polymerization of epoxides, e.g., ethylene oxide, propylene oxide, butylene oxide, tetrahydrofuran, styrene oxide or epichlorohydrin, each with itself, e.g., in the presence of BF$_3$, or by addition of these epoxides, optionally as mixtures, or successively, to starting components which contain reactive hydrogen atoms such as alcohols or amines, e.g., water, ethylene glycol, propylene-1,3- or -1,2-glycol, trimethylol propane, 4,4'-dihydroxydiphenylpropane, aniline, ammonia, ethanolamine or ethylenediamine. Sucrose polyethers such as those described, e.g., in German Pat. Nos. 1,176,358 and 1,064,938, may also be used according to this invention. It is frequently preferred to use polyethers which contain predominantly primary OH groups (up to 90% by weight, based on the total OH group content of the polyether). Also suitable are polyethers modified with vinyl polymers such as those which may be obtained by polymerizing styrene or acrylonitrile in the presence of polyethers (U.S. Pat. Nos. 3,383,351; 3,304,273; 3,525,093; and 3,110,695; and German Patent No. 1,152,536), and polybutadienes which contain OH groups.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers, polythioether esters or polythioether ester amides, depending on the cocomponents.

The polyacetals used may be, for example, the compounds which may be obtained from glycols, e.g., diethylene glycol, triethylene glycol, (4,4'-dihydroxydiphenyldimethylmethane) hexane-diol and formaldehyde. Polyacetals suitable for the invention may also be prepared by the polymerization of cyclic acetals.

The polycarbonates with hydroxyl groups used may be of the known kind, e.g., those which may be prepared by reacting diols, such as propane-1,3-diol, butane-1,4-diol and/or hexane-1,6-diol or diethylene glycol, triethylene glycol or tetraethylene glycol, with diarylcarbonates such as diphenylcarbonate or phosgene.

The polyester amides and polyamides include, e.g., the predominantly linear condensates obtained from polyvalent-saturated and -unsaturated carboxylic acids or their anhydrides and polyvalentsaturated and -unsaturated amino alcohals, diamines, polyamines and mixtures thereof.

Suitable polyepoxy compounds and/or resins may be mixed with the lignin-cellulose polyepoxy, then cured with the curing agent to produce lignin-cellulose epoxy products.

The polyepoxides to be used by the new process of the invention comprise those materials possessing more than one and, preferably, at least two, vicinal epoxy groups, i.e.:

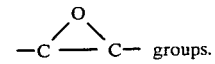

These compounds may be saturated or unsaturated, aliphatic, cycloaliphatic, aromatic or heterocyclic, and may be substituted, such as chlorine, hydroxyl group, ether radicals and the like. They may be monomeric or polymeric. The most common or conventional epoxy resins are obtained by reacting epichlorohydrin with a polyhydroxyl compound, such as Bisphenol A, in the presence of a catalyst.

For clarity, many of the polyepoxides, particularly those of the polymeric type, are described in terms of epoxy-equivalent values. The meaning of this expression is described in U.S. Pat. No. 2,633,458. The polyepoxides used in the present process are those having an epoxy equivalency greater than 1.0. Various examples of polyepoxides that may be used in the process of this invention are given in U.S. Pat. No. 2,633,458 and it is to be understood that much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate; butyl 9,12,15-octadecatrienoate; butyl eleostearate, monoglycerides of tung oil fatty acids, monoglycerides of soybean oil, sunflower, rapeseed, hempseed, sardine, cottonseed oil and the like.

Another group of the epoxy-containing materials used in the process of the invention includes the epoxidized acids, such as, for example, di(2,3-epoxybutyl) adipate; di(2,3-epoxybutyl) oxalate; di(3,3-epoxyhexyl) succinate; di(3,4-epoxybutyl) maleate; di(2,3-epoxyoctyl) pimetate; di(2,3-epoxybutyl) phthalate; di(2,3-epoxytyl) tetrahydrophthalate; di(4,5-epoxydodecyl) maleate; di(2,3-epoxybutyl) terephthalate; di(2,3-epoxypentyl) thiodipropionate; di(5,6-epoxytetradecyl) diphenyldicarboxylate; di(3,4-epoxybutyl) sulfoldibutyrate; tri(2,3-epoxybutyl) 1,2,4-butanetricarboxylate; di(5,6-epoxypentadecyl) tartarate; di(4,5-epoxytetradecyl) maleate; di(2,3-epoxybutyl) azelate; di(3,4-epoxybutyl) citrate; di(5,6-epoxyoctyl) cyclohexane-1,2-dicarboxylate; and di(4,5-epoxyoctadecyl) malonate.

Another group of the epoxy-containing materials includes those epoxidized esters of the unsaturated alcohols and unsaturated carboxylic acids such as 2,3-epoxybutyl-3,4,3',4'-epoxypentanoate; 3,4-epoxyhexyl-3,4-epoxyoctanoate; 3,4-epoxycyclohexyl-3,4-epoxycyclohexanoate; 3,4-epoxycyclohexanoate; 3,4-epoxycyclohexyl-4,5-epoxyoctanoate; 2,3-epoxycyclohexylmethyl epoxycyclohane carboxylate.

Still another group of the epoxy-containing materials includes epoxidized derivatives of polyethylenically-unsaturated polycarboxylic acids such as, for example:
dimethyl-8,9,12,13-diepoxydiconsanedioate;
dibutyl-7,8,11,12-diepoxyoctadecanedioate;
dioctyl-10-11-diethyl-9,9',12,13-diepoxydiconsanedioate;
dihexyl-6,7,10,11-diepoxyhexadecanedioate;
didecyl-9-epoxy-ethyl-10,11-epoxyoctadecanedioate;
dibutyl-3-butyl-3,4,5,6-diepoxycyclohexane-1,2-dicarboxylate;
dicyclohexyl-3,4,5,6-diepoxycyclohexane-1,2-dicarboxylate;
dibenzyl-1,2,4,5-diepoxycyclohexane-1,2-dicarboxylate;
and 5,6,10,11-diepoxyoctadecyl succinate.

Still another group comprises the epoxidized polyesters obtained by reacting unsaturated polyhydric alcohols and/or unsaturated polycarboxylic acid or anhydride groups, such as, for example, the polyester obtained by reacting 8,9,12,13-diconsanedienedioic acid with ethylene glycol; the polyester obtained by reacting diethylene glycol with 2-cyclohexene-1,4-dicarboxylic acid and the like; and mixtures thereof.

Still another group comprises the epoxidized polyethylenicallyunsaturated hydrocarbons, such as epoxidized 2,2-bis(2-cyclohexenyl) propane, epoxidized vinyl cyclohexene and epoxidized dimer of cyclopentadiene.

Another group is comprised of the epoxidized polymers and copolymers of diolefins, such as butadiene. Examples of this include, among others, butadiene-acrylonitrile copolymers, butadiene-styrene copolymers and the like.

Another group is comprised of the glycidyl-containing nitrogen compounds, such as diglycidyl aniline and di- and triglycidylamine.

The polyepoxides that are particularly preferred for use in the composition of the invention are the glycidyl ethers, particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and polyether B (described in the above-noted U.S. Pat. No. 2,633,458) are good examples of polyepoxides of this type.

Any suitable phenoxy resin may be polymerized with the lignincellulose polyepoxy resin by use of a polymerizing catalyst such as Lewis acid.

Suitable phenoxy resins are those comprising recurring units having the formula:

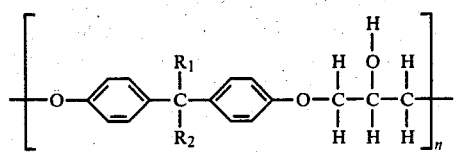

wherein $R_1$ and $R_2$ are each selected from the group consisting of hydrogen and alkyl radicals, the total number of carbon atoms in $R_1$ and $R_2$ being up to 12; and n is an integer having a value of at least two.

The basic chemical structure of phenoxy resins is similar to that of epoxy resins. Phenoxy resins, however, can be readily distinguished as a separate and unique resin class, differing from epoxides in several important characteristics, not having terminal, highly-reactive epoxy groups and being stable materials which have infinite shelf life. Phenoxy resins are thermoplastic. The phenoxy resins may be obtained by condensing epichlorohydrin with a suitable dihydroxy organic compound. Best results are obtained when using Bisphenol-A [2,2-(4-bishydroxyphenyl) propane] in the preparation of the resin. This is considered to be the preferred polyhydroxy compound. Other hydroxy-containing compounds such as resorcinol, hydroquinone, glycols, glycerol and mixtures thereof may be used in mixture with, or in lieu of, the hydroxy alkanes if desired. The di(monohydroxyaryl) alkanes, however, are preferred, with Bisphenol-A, as noted above, being the most preferred embodiment. The di(monohydroxyaryl) alkanes were previously listed in the invention.

The organic polyhydroxyl compound will react chemically with the polyfunctional epoxy compound.

The phenoxy resins may be mixed with the lignin-cellulose polyepoxy resin in any suitable proportions. The phenoxy resins may be mixed in the ratio of up to 100 parts by weight to 100 parts by weight of the lignin-cellulose polyepoxy resin.

Surface-active additives may also be used according to the invention. Suitable emulsifiers are, e.g., the sodium salts of ricinoleic sulphonates or of fatty acids, or salts of fatty acids with amines, such as oleic acid diethylamine or stearic acid diethanolamine. Other surface-active additives are alkali metal or ammonium salts of sulphonic acids, e.g., dodecylbenzone sulphonic acid or dinaphthyl methane disulphonic acid, or of fatty acids like ricinoleic acid, or of polymeric fatty acids.

The lignin-cellulose polyepoxy resin containing an organic polyhydroxyl compound is diluted with epichlorohydrin until it is fluid, then mixed with a curing agent, an amino-terminated maleic anhydridediethylene condensation product, and partially cured before reacting with a polyisocyanate.

The mixture of about equal parts of lignin-cellulose polyepoxy resin and a polyepoxy compound, glycidyl ether of Bisphenol-A, is mixed with amino-terminated propylene oxide-diethylenetriamine and partially cured, then reacted with a polyisocyanate.

The lignin-cellulose polyepoxy resin may be utilized by mixing with phenoxy resin, condensation product of epichlorohydrin with Bisphenol-A, and maleic acid in the amount of 15%, based on the total weight of the mixture.

Suitable reactive diluents may be used, such as epihalohydrins and acetonitriles, which also react with the lignin-cellulose polyepoxy resins.

Any suitable aldehyde may be used in this invention, such as formaldehyde, acetaldehyde, butyl aldehyde, chloral, acrolein, furfural, benzaldehyde, crotonaldehyde, propionaldehyde, pentanals, hexanals, heptanals, octanals and their simple substitution products, semi-acetals and full acetals, paraformaldehyde and mixtures thereof. Compounds containing active aldehyde groups, such as hexamethylenetetramine, phenoplasts and aminoplasts, may also be used. The aldehyde reacts with the broken-down alkali metal plant polymer.

Any suitable phenol compound may be used in this invention, such as phenol, cresols, cresylic acid, creosote, xylenols, cashew nut shell liquid, anacordol, p-tert-butyl phenol, cardol-2,6-dimethyl phenol, chlorophenol, nitrophenol, phenolic acid extracted from bark (U.S. Pat. No. 3,371,054) and mixtures thereof. The phenols react with epoxide and the aldehyde radical in the alkali metal plant polymer. The phenols are also solvents for the lignin-cellulose polyepoxy resins.

Any suitable halohydrin compound may be used in this invention, such as alkene chlorohydrins, e.g., ethylene chlorohydrin, alphadichlorohydrin, dibromohydrin, di-iodohydrin, glycerol α-monochlorohydrin, and mixtures thereof. They will react with both Components A and B, which are alkene chlorohydrins with the general formula of:

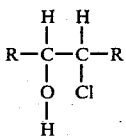

wherein R is an alkene.

Any suitable mono-epoxide compound may be used in this invention, such as alkylene oxide ($C_2$–$C_4$), e.g., ethylene oxide, propylene oxide, butylene oxide, tetrahydrofuran, styrene oxide or mixtures thereof. It is preferred to add the ethylene oxide at a pressure wherein the ethylene oxide is in a liquid state.

Polyurethane resinous and foam products are produced by mixing and reacting the following components:
  A. Lignin-cellulose polyepoxy resins in the amount of 1 to 200 parts by weight;
  B. Organic polyisocyanates or polyisothiocyanates in the amount of 50 to 100 parts by weight;
  C. A curing agent and/or activator (catalyst) in an amount up to 200 parts by weight.

Component A

Any suitable polyfunctional epoxide compounds may be used in this invention in order to produce the lignin-cellulose polyepoxy resin. Suitable polyfunctional epoxide compounds include substituted-epoxide compounds such as epihalohydrin, e.g., epichlorohydrin, epibromohydrin, methyl epichlorohydrin, di-epiiodohydrin, epifluorohydrin, epiiodohydrin and substituted butylene oxides like trichlorobutylene oxide, and mixtures thereof. Epichlorohydrin is the preferred polyfunctional epoxide compound.

The broken-down water-soluble alkali metal plant polymer is produced by heating a mixture of 2 parts by weight of a cellulose-containing plant with 1 to 3 parts by weight of an alkali metal hydroxide to from 150° C. to 220° C. while agitating for 5 to 60 minutes. The broken-down alkali metal cellulose polymer is soluble in water, alcohols, polyols, and other organic solvents and is a thick liquid above 150° C. and a brown solid below 150° C. The broken-down alkali metal plant polymer has lost a carbon dioxide radical from each molecule and the lignin-cellulose bond appears to be intact. When a plant product (cellulose) with the lignin removed is used in the production of broken-down alkali metal plant polymer, a dark-brown-colored water-soluble polymer is produced.

Any suitable alkali metal hydroxide may be used to produce broken-down alkali metal plant polymers; sodium hydroxide is preferred. Any suitable cellulose-containing plant or plant product, such as trees, shrubs, agricultural plants, seaweed, pulp wood, cotton or decomposed cellulose-containing plants such as humus, peat and certain soft brown coal, etc., may be used to produce broken-down alkali metal plant polymers.

A polyfunctional epoxide compound, preferably a polyfunctional halogenated epoxy compound, e.g., epichlorohydrin, will react chemically with an alkali metal lignin-cellulose polymer to produce a lignin-cellulose polyepoxy resin which may be partially cured by a catalytic amount of polymerizing agent, e.g., amines, Lewis acids and alkali compounds.

The chemical reactions of this invention may take place under any suitable conditions. While many of the reactions will take place acceptably at ambient temperature and pressure, better results are obtained in some cases at somewhat elevated temperature and pressure. Preferably, the reaction takes place at a temperature between 10° C. and the boiling temperature of the reactants and at a pressure wherein the gaseous reactants are in a liquid state. The reaction is oxothermic and, in some cases, it is necessary to cool the materials.

The components may be mixed in any suitable manner. The preferred method is to mix the epoxide compound and an alkali metal lignin-cellulose polymer and water in a closed system with an agitator, agitating the mixture at a pressure between ambient and 50 psig and between ambient temperature and the boiling temperature of the polyfunctional epoxy compound or water for from 30 minutes to 90 minutes, thereby producing a lignin-cellulose polyepoxy resin.

In an alternate method, alkali metal broken-down plant polymer is mixed in water, then the epoxide compound is added while agitating at a temperature between 10° C. and just below the boiling temperature of the reactants for 30 minutes to 4 hours.

The water-free epoxy resin may be diluted with a solvent, e.g., epichlorohydrin and ethylene chlorohydrin, after which the reacted lignin-cellulose epoxy polymer and salt produced in the reaction will be precipitated and be removed by decantation. The water and excess polyfunctional epoxy compound may be removed by evaporation.

In an alternate method, an additional step is taken wherein a suitable organic polyhydroxyl compound is added with the components in the amount of up to 50 parts by weight to 100 parts by weight of the epoxide compound and is reacted in the preferred method. In certain cases, better results are obtained by utilizing an autoclave with somewhat elevated pressure.

In another alternate method, an additional step is taken wherein a suitable organic polyepoxy compound and/or resin is mixed with the lignin-cellulose polyepoxy resin in the amount of up to 100 parts by weight of the polyepoxy resin to 50 parts by weight of the lignin-cellulose polyepoxy resin.

In another method, an additional step is taken wherein a phenoxy resin is mixed with the lignin-cellulose polyepoxy resin in the amount up to 100 parts by weight of the phenoxy resin to 100 parts by weight of the lignin-cellulose polyepoxy resin.

The polyfunctional epoxide compound and broken-down alkali metal plant polymer may be mixed in any suitable proportions, within the following limits:
Polyfunctional epoxide: 10 to 200 parts by weight;
Broken-down alkali metal plant polymer: 50 parts by weight;
Water: Up to 200 parts by weight to 50 parts by weight of the broken-down alkali metal plant polymer.

An excess of the polyfunctional epoxide compound may be used and remain as a solvent or be evaporated out by heating. An excess of the broken-down alkali metal plant polymer should be avoided because it will act as a curing agent and cure the lignin-cellulose polyepoxy resin into a solid product.

The additives may be added in any suitable proportions, within the following range:
(a) Polymerizing catalyst: Up to 100 parts by weight of a polymerizing catalyst to 50 parts by weight of the broken-down alkali metal plant polymer;
(b) Polyhydroxyl compound: Up to 100 parts by weight for each 50 parts by weight of the broken-down alkali metal plant polymer;
(c) Polyepoxy compound and/or resin: Up to 100 parts by weight for each 50 parts by weight of the broken-down alkali metal plant polymer;
(d) Phenoxy resin: Up to 100 parts by weight for each 50 parts by weight of the broken-down alkali metal plant polymer;
(e) Phenol compound: Up to 100 parts by weight for each 50 parts by weight of the broken-down alkali metal plant polymer;
(f) Aldehyde: Up to 100 parts by weight for each 50 parts by weight of the broken-down alkali metal plant polymer;
(g) Halohydrin: Up to 100 parts by weight for each 50 parts by weight of the broken-down alkali metal plant polymer;
(h) Mono-epoxide: Up to 100 parts by weight for each 50 parts by weight of the broken-down alkali metal plant polymer.

Polymerizing Catalyst

Any suitable epoxy resin polymerizing catalyst may be used in this invention. Suitable polymerizing catalysts include amines, Lewis acids, alkali metal oxides and hydroxides, and mercaptan-terminated liquid compounds.

The mercaptan-terminated, saturated type of elastomer may polymerize and lignin-cellulose polyepoxy resin at ambient or elevated temperature and may also be mixed with the amine and used as a polymerizing agent. Any mixtures of the various polymerizing agents, such as amines, certain Lewis acids, mercaptan-terminated compound and alkali metal compounds, may be used as the polymerizing agent.

Any suitable Lewis acid may be used in this invention. A Lewis acid is any electron acceptor relative to other reagents present in the system. A Lewis acid will tend to accept a pair of electrons furnished by an electron donor (or Lewis base) in the process of forming a chemical compound. A "Lewis acid" is defined for the purpose of this invention as any electron-accepting material relative to the polymer to which it is complexed.

Component B

Any suitable organic polyisocyanate may be used according to the invention, including aliphatic, cycloaliphatic, araliphatic, aromatic and heterocyclic polyisocyanates and mixtures thereof. Suitable polyisocyanates which may be employed in the process of the invention are exemplified by the organic diisocyanates which are compounds of the general formula:

$$O{=}C{=}N{-}R{-}N{=}C{=}O$$

wherein R is a divalent organic radical such as an alkylene, aralkylene or arylene radical. Such suitable radicals may contain, for example, 2 to 20 carbon atoms. Examples of such diisocyanates are:
tolylene diisocyanate;
p,p'-diphenylmethane diisocyanate;
phenylene diisocyanate;
m-xylylene diisocyanate;
chlorophenylene diisocyanate;
benzidene diisocyanate;
naphthylene diisocyanate;
decamethylene diisocyanate;
hexamethylene diisocyanate;
pentamethylene diisocyanate;
tetramethylene diisocyanate;
thiodipropyl diisocyanate;
propylene diisocyanate;
ethylene diisocyanate.

Other polyisocyanates, polyisothiocyanates and their derivatives may be equally employed. Fatty diisocyanates are also suitable and have the general formula:

$$\begin{array}{c} \text{NCO} \\ | \\ (\text{CH}_2) \\ | \\ \text{CH}_3(\text{CH}_2)_x\text{CH}(\text{CH}_2)_y\text{NCO} \end{array}$$

wherein x+y totals 6 to 22 and z is 0 to 2, e.g., isocyanastearyl isocyanate.

It is generally preferred to use commercially readily available polyisocyanates, e.g., tolylene-2,4- and -2,6-diisocyanate and any mixtures of these isomers ("TDI"), polyphenyl-polymethylene-isocyanates obtained by aniline-formaldehyde condensation followed by phosgenation ("crude MDI"), and modified polyisocyanate-containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates of aniline or anilines alkyl-substituted on the nucleus with aldehydes or ketones, may be used in this invention. Solutions of distillation residues accumulating during the production of tolylene diisocyanates, diphenyl methane diisocyanate, or hexamethylene diisocyanate, in monomeric polyisocyanates or in oraganic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene-1,4-; and methylene-bis(cyclohexyl-4,4') diisocyanate may be used in this invention. Suitable polyisocyanates which may be used according to the invention are described, e.g., by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethane prepolymers and then also used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and preferably from about 1,000 to about 6,000 e.g., polyesters, polyethers, polythioethers, polyacetals, polycarbonates or polyester amides containing at least 2, generally from 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used such as, for example, ethylene glycol; propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as ε-caprolactone, or hydroxycarboxylic acid such as ω-hydroxycaproic acid, may also be used.

The polyethers with at least 2, generally from 2 to 8 and, preferably, 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$, or by addition of these opoxides, optionally as mixtures or successively, to starting components which contain reactive hydrogen atoms such as alcohols or amines, e.g., water; ethylene glycol; propylene-1,3- or -1,2-glycol; trimethylol propane; 4,4-dihydroxydiphenylpropane; aniline; ammonia; ethanolamine or ethylenediamine; sucrose polyethers such as those described, e.g., in German Auslegeschriften Nos. 1,176,358 and 1,064,938, may also be used according to the invention. It is frequently preferred to use polyethers which contain predominantly primarily OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation products of thiodiglycol with itself and/or with other compounds.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polyisocyanate curing agents and/or polyisocyanate activators (catalysts) may be used in the process of producing polyurethane silicon acid resinous or foamed products. The following are examples of polyisocyanate curing agents and activators:

1. Water.
2. Water containing 10% to 70% by weight of an alkali metal silicate, such as sodium and/or potassium silicate. Crude commercial alkali metal silicate may contain any substances, e.g., calcium silicate, magnesium silicate, borates and aluminates and may also be used. The molar ratio of $Me_2OSiO_2$ (Me=metal) is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate such as sodium metasilicate, potassium metasilicate and commercial dry granular sodium and potassium silicates. Heating is required to start the curing reaction.
6. Water containing 25% to 70% by weight of silica sol.
7. Activators (catalysts) which act as curing agents and are added to the polyurethane silicate prepolymer in the amount of 0.001% to 10% by weight. They may be added in water.
    (a) Tertiary amines, e.g., triethylamine; tributylamine; N-methyl-morpholine; N-ethylmorpholine; N,N,N',N'-tetramethylenediamine; 1,4-diazo-bicyclo(2,2,2)-octane; N-methyl-N'-dimethylaminoethyl piperazine; N,N-dimethylbenzylamine; bis(N,N-diethylaminoethyl)adipate; N,N-diethylbenzylamine; pentamethyldiethylenetriamine; N,N-dimethylcyclohexylamine; N,N,N',N'-tetramethyl-1,3-butanediamine; N,N-dimethyl-betaphenylethylamine; and 1,2-dimethylimidaxole. Suitable tertiary amine activators which contain hydrogen atoms which are reactive with isocyanate groups include, e.g., triethanolamine; triisopanolamine; N,N-dimethylethanolamine; N-methyl-diethanolamine; N-ethyl-diethanolamine; and their reactive products with alkylene oxides, e.g., propylene oxide and/or ethylene oxide and mixtures thereof.
  (b) Organo-metallic compounds, preferably organo-tin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.
  (c) Silaamines with carbon-silicon bonds as described, e.g., in British Pat. No. 1,090,589, may also be used as activators, e.g., 2,2,4-trimethyl-1,2-silamorpholine or 1,3-diethylaminoethyl-tetramethyldisiloxane.
  (d) Other examples of catalysts which may be used according to the invention, and details of their action, are described in Kunststoff-Handbuch, Volume VII, published by Vieweg and Hochtlen, Carl-Hanser-Verlag, Munich, 1966, e.g., on pages 96 and 102.
8. Water containing 1% to 10% by weight of bases which contain nitrogen such as tetraalkyl ammonium hydroxides.
9. Water containing 1% to 10% by weight of alkali metal hydroxides such as sodium hydroxide; alkali metal phenolates such as sodium phenolate or alkali metal alcoholates such as sodium methylate.
10. Water containing sodium polysulfide in the amount of 1% to 10% by weight.
11. Water containing 20% to 70% by weight of a water-binding agent, being capable of absorbing water to form a solid or a gel, such as hydraulic cement, synthetic anhydrite, gypsum or burnt lime.
12. Mixtures of the above-named curing agents.

Surface-active additives (emulsifiers and foam stabilizers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid, or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described, e.g., in U.S. Pat. No. 3,629,308. These additives are preferably used in quantities of 0% to 20%, but preferably 0.01% to 20%, by weight, based on the reaction mixture.

Negative catalysts, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g., tris-chloroethyl-phosphate or ammonium phosphate and polyphosphates, stabilizers against aging and weathering plasticizers, fungicidal and bacteriocidal substances and fillers, e.g., barium sulphate, kieselguhr, carbon black or whiting, may also be used according to the invention.

Further examples of surface additives, foam stabilizers, cell regulators, negative catalysts, stabilizers, flame-retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich, 1966, e.g., on pages 103 to 113. The halogenated paraffins and inorganic salts of phosphoric acid are the preferred fire-retarding agents.

The preferred curing agent is an aqueous solution of silicates, sodium silicate and/or potassium silicate in water which is normally known as water glass. Aqueous solutions of silicates may be prepared in the form of 25% to 70% silicates. Silica sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are preferably produced with concentrated silicated solutions which, of necessary, are adjusted to a lower viscosity by addition of alkali metal hydroxide. Solutions with concentrations of 40% to 70% by weight can be prepared in this way. On the other hand, to produce open-celled, light-weight foams, it is preferred to use silicate solutions with concentrations of 20% to 45% by weight in order to obtain low viscosities, sufficiently long reaction times and low unit weights. Silicate solutions with concentrations of 15% to 45% are also preferred when substantial quanties of finely divided inorganic fillers are used.

Suitable flame-resistant compounds may be used in the products of this invention such as those which contain halogen or phosphorus, e.g., tributylphosphate; tris(2,3-dichloropropyl) phosphate; polyoxypropylene-chloromethylphosphonate; cresyldiphenylphosphate; tricresylphosphate; tris(beta-chloroethyl) phosphate; tris(2,3-dichloropropyl)phospante; triphenyl-phosphate; ammonium phosphate; perchlorinated diphenyl phosphate; perchlorinated terephenyl phosphosphate; hexabromocyclodecane; tribromophenol; dibromopropyldiene, hexabromobenzene; octabromodiphenylether; pentabromotoluol; polytribromostyrol; tris(-bromocresyl) phosphate; tetrabromobis-phenol A; tetrabromophthalic acid anhydride; octabromodiphenyl phosphate; tri(dibromopropyl) phosphate; calcium hydrogen phosphate; sodium or potassium dihydrogen phosphate; disodium or dipotassium hydrogen phosphate; ammonium chloride; phosphoric acid; polyvinylchloride tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing components are, however, preferred in the polyurethane silicon acid products and are added in the amount of up to 20%, based on the reaction mixture.

When halogen or phosphorus compounds are added, a minimum amount of toxic gas is given off in the event of a very intense heat because the HCl or HBr reacts with the alkali metal atoms to form a salt, such as NaCl or NaBr.

In the cases where the viscosity of the polyisocyanate is too high, it may be reduced by adding a low-viscosity isocyanate, or even by adding inert solvents such as acetone, diethyl ether of diethylene glycol, ethyl acetate and the like.

In cases where the curing agent contains an aqueous alkali silicate, the isocyanate-terminated polyurethane prepolymer may be sulphonated. It is usually sufficient to react the isocyanate-terminated polyurethane prepolymer with concentrated sulphuric acid or oleum of sulfur trioxide in order to produce a sulphonated poly (urethane silicate) prepolymer containing the sulphonic group in the amount of 3 to 100 milliequivalents/100 g. The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyester-silicate resinous products.

The sulphonated isocyanate-terminated polyurethane prepolymer can be directly mixed with an aqueous silicate solution, in which case the corresponding metal salt is formed in situ. The sulphonated isocyanate-terminated polyurethane prepolymer may be completely or partly neutralized at the onset by the addition of animes, metal alcoholates, metal oxides, metal hydroxide or metal carbonates.

Water-binding components may be used in this invention, including organic or inorganic water-binding substances which have, first, the ability to combine chemically, preferably irreversibly, with water and, second, the ability to reinforce the polyurethane plastics of the invention. The term "water-binding component" is used herein to identify a material, preferably granular or particulate, which is sufficiently anhydrous to be capable of absorbing water to form a solid or gel such as mortar or hydraulic cement.

A water-binding component such as hydraulic cement, synthetic anhydrides, gypsum or burnt lime may be added to any of the components to produce a tough, somewhat flexible solid or cellular solid concrete. The water-binding component may be added in amounts from 0 to 200% by weight, based on the weight of Components A and B. When a water-binding agent is added and when the curing agent is an aqueous alkali metal silicate solution, a halogen- or phosphorus-containing compound or mixture thereof may be added in the amount of 1% to 30% by weight, based on the weight of the reactants, A and B.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, Published by Kirk-Other, pages 684 to 710, of the type of cement which may be used in the production of this invention and are incorporated herein by reference.

Organic blowing agents may be used to improve or increase the foaming to produce cellular solid plastics such as acetone, ethyl acetate, methanol, ethanol, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, azoisobutyric acid nitrile, may also act as blowing agents. Compressed air may act as a blowing agent. Other examples of blowing agents and details about the use of blowing agents are described in Kunststoff-Handbuch, Volume VII, published by Vieweg and Hochtlen, Carl-Hanser-Verlag, Munich, 1966, on pages 108 and 109, 453 to 455 and 507 to 510.

The proportions of the components may be adjusted to produce a highly cellular solid. When water is used, it reacts with the NCO group to produce $CO_2$ and pores are produced in the product by the evolved $CO_2$. In certain cases, the $CO_2$ is rapidly evolved and escapes before the product hardens, and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with Components A, B or C or be reacted with the polyisocyanate to produce a polyurethane silicon acid prepolymer. In that case, the function of the polyisocyanate is that of a non-volatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agent by bringing about the evolution of hydrogen. Compressed air may be mixed in the components and may also be used to mix the components, then be used as the blowing agent. These metal powders also have a hardening and reinforcing effect.

The properties of the forms (cellular solid) obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 12 times their original volume.

The polyurethane plastics produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues the foaming until the reaction is complete. A temperature between 40° C. and 150° C. may be required to initiate foaming. The blowing agent is usually added to the polyisocyanate.

Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are applied together to the mold, for example, by means of a spray apparatus. The shaped products obtainable in this way may be used as building elements, e.g., in the form of sandwich elements, either as such or after they have been laminated with metal, glass or plastics; if desired, these sandwich elements may be foamed. The products may be used as hollow bodies, e.g., as containers for goods which may be required to be kept moist or cool, as filter materials or exchanges, as catalyst carriers or carriers of other active substances, as decorative elements, furniture components and fillings or for cavities. They may be used in the field of model building and mold building, and the production of molds for metal casting may also be considered.

Instead of blowing agents, finely divided inorganic or organic hollow particles, e.g., hollow expanded beads of glass, plastics and straw, may be used for producing cellular or solid products. These products may be used as insulating materials, cavity fillings, packaging materials, building materials which have good solvent resistance and advantageous fire-resistant characteristics. They may also be used as lightweight building bricks in the form of sandwiches, e.g., with metal-covering layers for house building and the construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyurethane, poly(urethane silicate) copolymers, urea-formaldehyde, phenol-formaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered, metallized, coated, laminated, galvanized, vapor treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness, yet they are still elastic. They are resistant to tension and compression and have a high dimensional stability to heat and high flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used as a filler, as a soil conditioner, as a substrate for the propagation of seedlings, cutting and plants or cut flowers.

The foamed or solid concrete produced by reacting the lignincellulose polyepoxy resin polyol and polyisocyanate with a waterbinding component may be used as surface coatings having good adhesion and resistance-to-abrasion properties, as mortars, and for making molded products, particularly in construction engineering and civil engineering, such as for building walls, igloos, boats and for roadbuilding, etc. These products are light-weight, thermal-insulating materials with excellent mechanical properties and fire resistance. The amount of water-binding component used varies greatly, depending on the type of product desired, from 1% to 200% by weight, based on Components A, B and C and polyisocyanate. In certain cases, it is desirable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumbbell shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, alumino silicates, cements, basalt wool or powder, glass fibers, carbon fibers, graphite, carbon black, Al-, Fe, Cr- and Ag-powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers, may be added to the mixture of the Components A, B and C in many applications. Among the numerous organic polymers which may be used, e.g., as powders, granules, foam particles, beads, hollow beads, foamable (but not-yet-foamed) particles, fibers, tapes, woven fabrics, or fleeces, the following may be mentioned as examples: polystyrene, polyethylene, polypropylene, polyacrylonitrile, polybutadiene, polyisoprene, polytetrafluoroethylene, aliphatic and aromatic polyesters, melamine, urea, phenol resins, phenol silicate resins, polyacetal resins, polyepoxides, polyhydantoins, polyureas, polyethers, polyurethanes, polyimides, polyamides, polysulphones, polycarbonates and copolymers thereof.

The composite materials, according to the invention, may be mixed with considerable quantities of fillers without losing their advantageous properties, and, in particular, composite materials which consist predominantly of organic constituents which are, preferably, filled with inorganic fillers; where silicate constituents predominate, it is, preferably, filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free from isocyanate groups. The mixtures obtained in this way have a long pot life and may be applied in thin layers which gradually harden in the course of time. The liberated $CO_2$ acts as the curing agent. In a two-stage or multistage hardening in which, for example, an excess of water is used, there is a rapid evolution of $CO_2$ and the polyurethane silicon acid resinous product is converted into a workable form which may be used as putties, coating agents, grouting materials or mortar. This thermoplastic form may also be injection-molded, extruded or worked-up in a kneader.

In many cases, the polyurethane resinous and foamed products produced by the invention are soluble in organic solvents and may be used as a tough coating agent for wood and metal. The mixtures of the invention are also suitable for use as impregnation agents for finishing fibers. The mixtures may also be extruded through dies or slots and be converted into fibers and foils. These fibers and foils may be used for producing synthetic incombustible paper or fleeces.

When the lignin-cellulose polyepoxy resin and polyisocyanate are combined with expanded clay and are in alkali metal silicate solution, a very good concrete is obtained which can, for exmaple, be used as panels in the construction field. In this case, the foam material (expanded clay) plays the part of the binding material.

The preferred method to produce polyurethane product is to mix 1 to 200 parts by weight of a lignin-cellulose polyepoxy resin which is produced by mixing and reacting 10 to 200 parts by weight of a polyfunctional epoxide compound and 50 parts by weight of broken-down alkali metal plant polymer, and 5 to 100 parts by weight of a polyisocyanate or polyisothiocyanate at 0° C. to 200° C., preferably at 20° C. to 100° C., and allowing the mixture to react, optionally containing a curing agent, a blowing agent, a catalyst (initiator), a filler, a fire-retardant agent, a water-binding agent and a polyol, thereby producing a polyisocyanate product.

In an alternate process, an organic compound in the amount of up to 100 parts by weight which is selected from the group consisting of aldehydes, alkene halohydrin, phenol compounds, organic monoepoxy compound, organic amines, organic polyepoxy compounds, organic polyhydroxy compounds (polyols), and mixtures thereof, is added with the broken-down alkali metal plant polymer when reacted with a polyfunctional epoxide compound in order to produce the lignin-cellulose polyepoxy resin.

In an alternate process, the organic polyisocyanate is first reacted with a polyol to produce a liquid isocyanate-terminated polyurethane prepolymer and the polyol is added in the ratio of 1 to 50 mols to 50 to 99 mols of the polyisocyanate, then reacted with the lignin-cellulose polyepoxy resin to produce a polyurethane product.

In another alternate process, a water-binding agent in an amount up to 200 parts by weight is added with the lignin-cellulose polyepoxy resin and/or polyisocyanate and/or curing agent.

In still another alternate process, an oxidated silicon compound, selected from the group consisting of hydrated silica, silicoformic acid, alkali metal silicates and mixtures thereof, is first reacted with the polyisocyanate to produce an isocyanate-terminated polyisocyanate prepolymer, then reacted with the lignin-cellulose polyepoxy resin to produce a polyurethane silicate product. The isocyanate-terminated polyisocyanate silicate prepolymer is produced by mixing up to 50 parts by weight of the oxidated silicon compound with 50 to 100 parts by weight of the polyisocyanate compound, then heating the mixture at 30° C. to 40° C., while agitating for 10 to 30 minutes, thereby producing an isocyanate-terminated polyurethane silicate prepolymer.

In a further alternate process, an organic amine compound, preferably a tertiary amine, is added with the broken-down alkali metal plant polymer, then the polyfunctional epoxy compound is slowly added while agitating and keeping the temperature below the boiling point of the polyfunctional epoxy compound, thereby producing a lignin-cellulose polyepoxy resin which contains an amine catalyst. The lignin-cellulose polyepoxy resin is then mixed with, and allowed to react with, a polyisocyanate, the reactive mixture optionally containing a blowing agent, a foam regulator, a fire-retardant agent, a filler, an emulsifier, a polyol, a curing agent, a water-binding agent and mixtures thereof.

DESCRIPTION OF PREFERRED EMBODIMENTS

My invention will be illustrated in greater detail in the specific Examples which follow, which detail the preferred embodiments of my process. It should be understood that the scope of my invention is not limited to the specific processes set out in the Examples. Parts and percentages are by weight, unless otherwise indicated.

EXAMPLE 1

About 1 part by weight of lye flakes (NaOH) and 2 parts by weight of fir sawdust are mixed, then heated to a temperature between 150° C. and 220° C. while agitating at ambient pressure, with care being taken for the mixture not to burn, for 5 to 60 minutes or until the mixture softens and expands into a dark-brown, thick liquid when hot. It cools to a solid, thereby producing a brokendown alkali metal plant polymer which is water soluble.

Other plant particles may be used in place of fir sawdust, such as:

| | | | |
|---|---|---|---|
| (a) | oak sawdust | (g) | bagasse |
| (b) | ash sawdust | (h) | paper |
| (c) | seaweed | (i) | oat straw |
| (d) | cotton | (j) | grass clippings |
| (e) | corn cobs | (k) | pine sawdust |
| (f) | cotton stalks | (l) | equal parts of paper and fir sawdust |

EXAMPLE 2

About equal parts by weight of sodium hydroxide and a plant particle listed below are mixed, then heated to a temperature between 150° C. and 220° C. while agitating at ambient pressure for 5 to 60 minutes or until the mixture softens and expands into a thick brown liquid which solidifies on cooling, thereby producing a brokendown alkali metal plant polymer. The polymer is ground into small particles.

| | | | |
|---|---|---|---|
| (a) | fir sawdust | (j) | equal mixtures of (a) and cotton |
| (b) | oak sawdust | (k) | pine sawdust |
| (c) | beech sawdust | (l) | maple sawdust |
| (d) | redwood sawdust | (m) | elm sawdust |
| (e) | gum sawdust | (n) | corn cob particles |
| (f) | sigmore sawdust | (o) | seaweed particles |
| (g) | cotton stalk particles | (p) | cornstalk particles |
| (h) | mixture of weed particles | (q) | bagasse particles |
| (i) | equal mixture of (a) and newspapers | (r) | mixtures thereof |

EXAMPLE 3

About equal parts by weight of potassium hydroxide and a plant particle selected from the list below are mixed, then heated to a temperature between 150° C. and 220° C. while agitating at ambient pressure for 5 to 60 minutes or until the mixture softens and expands into a dark-brown, thick liquid, thereby producing a broken-down alkali metal plant polymer. The polymer is ground into small particles.

| (a) fir sawdust | (g) rice straw particles |
|---|---|
| (b) pine sawdust | (h) wheat straw particles |
| (c) seaweed particles | (i) bagasse particles |
| (d) corn cob particles | (j) oak sawdust |
| (e) corn stalk particles | (k) gum sawdust |
| (f) ash sawdust | (l) cedar sawdust |

EXAMPLE 4

About equal parts by weight of the broken-down alkali metal polymer, as produced in Example 1a, are thoroughly mixed with epichlorohydrin, then heated to just below the boiling temperature of epichlorohydrin while agitating for 30 to 90 minutes, thereby producing lignin-cellulose polyepoxy resin and sodium chloride.

EXAMPLE 5

About equal parts by weight of the broken-down alkali metal plant polymer, as produced in Example 2a, water and epichlorohydrin are mixed, then heated for 30 to 90 minutes at a temperature just below the boiling temperature of epichlorohydrin while agitating at ambient pressure. The temperature is then elevated to just above the boiling point of water while agitating in order to evaporate most of the water, thereby producing lignin-cellulose polyepoxy resin and sodium chloride.

Other polyfunctional epoxide compounds may be used in place of epichlorohydrin, such as epibromohydrin, methyl epichlorohydrin, epifluorohydrin, epiiodohydrin and trichlorobutylene oxide and mixtures thereof.

EXAMPLE 6

About 2 parts by weight of epichlorohydrin are mixed with 3 parts by weight of the broken-down alkali metal plant polymer produced in Example 2b, then heated to just below the boiling temperature of epichlorohydrin while agitating at ambient temperature for 30 to 90 minutes, thereby producing lignin-cellulose polyepoxy resin and sodium chloride.

EXAMPLE 7

About 2 parts by weight of the broken-down alkali metal plant polymer as produced in Example 2k, and 1 part by weight of water are mixed, then epichlorohydrin is added in an amount wherein the chlorine atoms and sodium atoms are about equal. The mixture is then added to an autoclave with a mixer and heated to just below the boiling temperature of epichlorohydrin while agitating for 30 to 90 minutes, thereby producing lignin-cellulose polyepoxy resin. The resin is then diluted with an organic solvent, such as epichlorohydrin, ethylene chlorohydrin or other solvents. The salt and unreacted sawdust settle to the bottom and the resin is decanted off. The solvent is then removed by distillation, thereby recovering the lignin-cellulose epoxy resin.

Other polyfunctional epoxide compounds may be used in place of epichlorohydrin, such as trichlorobutylene oxide, epibromohydrin, methyl epichlorohydrin, epifluorohydrin, epiiodohydrin and mixtures thereof.

EXAMPLE 8

About 4 parts by weight of the broken-down alkali metal plant polymer, as produced in Example 1b, 2 parts by weight of epichlorohydrin and 2 parts by weight of trichlorobutylene oxide are mixed in an autoclave, then heated to just below the boiling temperature of epichlorohydrin while agitating for 30 to 90 minutes at about 30 psig, thereby producing a lignin-cellulose polyepoxy resin.

EXAMPLE 9

About 4 parts by weight of the broken-down alkali metal plant polymer, as produced in Example 2i, 1 part by weight of ethylene chlorohydrin and 2 parts by weight of epichlorohydrin are mixed in an autoclave, then heated to just below the boiling temperature of epichlorohydrin while agitating for 30 to 90 minutes, thereby producing lignin-cellulose polyepoxy resin and sodium chloride.

About equal parts by weight of the lignin-cellulose polyepoxy resin and MDI are mixed, thereby producing a solid polyurethane resin with a very small amount of cellular portion. The reacting mixture may be poured into sheets and used for panels in construction.

EXAMPLE 10

About 10 parts by weight of the lignin-cellulose polyepoxy resin, as produced in Example 9, 2 parts by weight of trichlorofluoroethane and 0.5 part by weight of triethylamine are mixed, then 10 parts by weight of MDI are added and thoroughly mixed; the mixture begins to expand in 15 to 30 seconds and expands to produce a rigid polyurethane foam which weighs about 2 pounds per cubic foot. The foam may be formed or cut into panels which may be used for sound and thermal insulation, as cores in doors, etc. The foaming mixture may be poured into boat hulls and foamed in place to be used for floatation or insulation.

EXAMPLE 11

About 4 parts by weight of the broken-down alkali metal plant polymer, as produced in Example 3a, 1 part by weight of water, 1 part by weight of resorcinol and 4 parts by weight of epichlorohydrin are added to an autoclave, then heated to just below the boiling point of epichlorohydrin while agitating for 30 to 90 minutes, thereby producing lignin-cellulose polyepoxy resins and potassium chloride.

About 10 parts by weight of the lignin-cellulose polyepoxy resin and 0.5 part by weight of diethylenetriamine are mixed, then 7 parts by weight of TDI (toluenediisocyanate) are added and mixed thoroughly; the mixture expands, thereby producing a rigid polyurethane foam.

EXAMPLE 12

About 2 parts by weight of broken-down alkali metal plant polymer, as produced in Example 2k, 1 part by weight of the broken-down alkali metal plant polymer as produced in 2g, 2 parts by weight of Bisphenol-A, 1 part by weight of water and an amount of epichlorohydrin, wherein the chloride atoms and sodium atoms are about equal, are added to an autoclave, then heated to a temperature just below the boiling point of epichlorohydrin at 20 psi while agitating for 30 to 90 minutes, thereby producing a lignin-cellulose polyepoxy resin.

About 10 parts by weight of the lignin-cellulose polyepoxy resin, 0.25 part by weight of triethylamine, 5 parts by weight of MDI, 3 parts by weight of TDI and 1 part by weight of trichlorotrifluoroethane are thoroughly mixed; the mixture begins to expand in 15 to 30 seconds and expands in 45 to 90 seconds, producing a rigid polyurethane foam which weighs about 1.7 to 2.2 pounds per cubic foot.

EXAMPLE 13

About 3 parts by weight of the broken-down alkali metal plant polymer, as produced in Example 2j, 1 part by weight of glycerol and 3 parts by weight of epichlorohydrin are mixed, then heated to a temperature just below the boiling temperature of epichlorohydrin while agitating for 30 to 90 minutes, thereby producing lignin-cellulose polyepoxy resin and salt.

About 10 parts by weight of the lignin-cellulose polyepoxy resin, 0.5 part by weight of triethanolamine and 2 parts by weight of ethylene dichloride are mixed, then 10 parts by weight of a 25% solution of a distillation residue of the distillation of commercial tolylene diisocyanate in crude phosgenation product of an aniline-formaldehyde condensate, with an NCO content of about 26% by weight, are added and thoroughly mixed. The mixture expands to produce a rigid polyurethane foam weighing about 2 pounds per cubic foot.

EXAMPLE 14

About 2 parts by weight of broken-down alkali metal plant polymer, as produced in Example 1c, 2 parts by weight of the broken-down alkali metal plant polymer as produced in Example 3b, 2 parts by weight of propylene glycol and 4 parts by weight of epichlorohydrin are added to an autoclave, then heated to just below the boiling temperature of epichlorohydrin at 20 psi while agitating for 30 to 90 minutes, thereby producing lignin-cellulose polyepoxy resin.

About 10 parts by weight of the lignin-cellulose polyepoxy resin, 8 parts by weight of an isocyanate-terminated polyurethane prepolymer (which was produced by mixing 9 parts by weight of a commercial-grade 4,4'-diphenylmethane and 1 part by weight of a trimethylol propane-initiated polyethylene glycol with an OH number of 250, NCO content of about 25%), 0.5 part by weight of triethylenediamine and 2 parts by weight of methylene chloride are mixed thoroughly. The mixture begins to expand in 15 to 30 seconds and expands for 60 to 90 seconds to produce a rigid polyurethane foam weighing 2 to 2.5 pounds per cubic foot.

EXAMPLE 15

About 4 parts by weight of the broken-down alkali metal polymer, as produced in Example 2b, 2 parts by weight of an aqueous solution containing 37% formaldehyde and 2 parts by weight of epichlorohydrin are added to an autoclave, then heated to a temperature just below the boiling point of epichlorohydrin at 15 psi while agitating for 3 to 90 minutes, thereby producing a lignin-cellulose polyepoxy resin and sodium chloride.

Other aldehydes may be used in place of formaldehyde, such as acetaldehyde, butyl aldehyde, chloral, acrolein, furfural, benzaldehyde, crotonaldehyde, propionaldehyde, pentanals, hexanals, octanals and their simple substituted products, semi-acetate and full acetals, paraformaldehyde and mixtures thereof.

About 10 parts by weight of the lignin-cellulose polyepoxy resin, 0.25 part by weight of triethylamine, 4 parts by weight of sodium metasilicate pentahydrate, 10 parts by weight of MDI ("PAPI" produced by Upjohn) and 2 parts by weight of trichlorotrifluoroethane are mixed. The mixture expands to produce a rigid polyurethane foam.

EXAMPLE 16

About 4 parts by weight of the broken-down alkali metal plant polymer, as produced in Example 1(l), 1 part by weight of crotonaldehyde, 2 parts by weight of epichlorohydrin and 0.5 part by weight of epibromohydrin are mixed, then heated to a temperature just below the boiling point of epichlorohydrin while agitating for 30 to 90 minutes, thereby producing an aldehyde lignin-cellulose polyepoxy resin and sodium chloride.

About 20 parts by weight of the aldehyde lignin-cellulose polyepoxy resin, c0 parts by weight of an isocyanate-terminated polyurethane prepolymer, listed below, 1 part by weight of ethylenediamine, 5 parts by weight of trichlorotrifluoroethane, and 10 parts by weight of sodium metasilicate pentahydrate are thoroughly mixed at 30° C. to 40° C. and in 15 to 45 seconds, the mixture begins to expand. The mixture expands to produce a rigid polyurethane silicate foam product.

| Example | Isocyanate-terminated polyurethane prepolymer |
|---|---|
| a | Toluene diisocyanate with polypropylene glycol (mol. wt. 500) in an NCO/OH ratio of 25:1; |
| b | Toluene diisocyanate with castor oil to produce a prepolymer with an NCO content of about 15%; |
| c | 20% solution of a distillation residue of the distillation of commercial tolylene diisocyanate in a crude phosgenation product of an aniline-formaldehyde condensation with an NCO content of about 30%, with polyethylene glycol (mol. wt. 1000) to produce an isocyanate-terminated prepolymer with an NCO content of about 17%; |
| d | Diisocyanatodiphenylmethane with a tetrafunctional polypropylene glycol (mol. wt. 500) to produce a prepolymer having about 20% NCO groups; |
| e | Toluene diisocyanate with a liquid hydroxyl-terminated polybutadiene (mol. wt. about 1000) to produce a prepolymer with an NCO content of about 7%; |
| f | Toluene diisocyanate with a hydroxyl-group-containing polysulfide polymer to produce a prepolymer with an NCO content of about 12%; |
| g | Methylene bis-phenyl diisocyanate with a liquid polyepichlorohydrin to produce a prepolymer of about 21%; |
| h | Tolylene diisocyanate with a polyester (4 mols of glycerol, 2.5 mols of adipic acid and 0.5 mol of phthalic anhydride) to produce a prepolymer with an NCO content of about 23%; |
| i | MDI with polyethylene glycol (mol. wt. 2000) to produce a prepolymer with an NCO content of about 28%. |

EXAMPLE 17

About 3 parts by weight of the broken-down alkali metal plant polymer as produced in Example 2c, 1 part by weight of a liquid formaldehyde phenol resin produced in the presence of an acidic catalyst and containing free aldehyde radicals, and 3 parts by weight of epichlorohydrin are mixed, then heated to just below the boiling temperature of epichlorohydrin while agitating for 30 to 90 minutes, thereby producing lignin-cellulose polyepoxy resin.

About 20 parts by weight of the lignin-cellulose polyepoxy resin and 5 parts by weight of a polyol, listed below, 20 parts by weight of a polyisocyanate listed below, 1 part by weight of triethylamine and 4 parts by weight of trichlorotrifluoroethane are thoroughly mixed at 20° C. to 30° C. The mixture begins to expand in 15 to 45 seconds, thereby producing a rigid polyurethane foam.

| Example | Polyol | Polyisocyanate |
|---|---|---|
| a | Triethylene glycol; | TDI; |
| b | Propylene glycol; | MDI; |
| c | Glycerol; | MDI; |
| d | Butylene glycol; | MDI; |
| e | Polyethylene glycol (mol. wt. 480); | Distillation residue of tolylene diisocyanate in a crude phosgenation product of an aniline-formaldehyde condensation with an NCO content of about 30%; |
| f | Polypropylene glycol (mol. wt. 600); | Methylene bis-phenyl diisocyanate; |
| g | Polypropylene glycol (mol. wt. 1200); | MDI; |
| h | Polyethylene glycol (mol. wt. 600); | TDI; |
| i | Polyester (3.8 mols glycol, 0.5 mol phthalic anhydride and 2.5 mols adipic acid); | MDI; |
| j | Castor oil; | TDI; |
| k | Polyethylene triol (mol. wt. 1000); | Hexamethylenediisocyanate. |

EXAMPLE 18

About 3 parts by weight of the broken-down alkali metal plant polymer, as indicated in Example 2a, 1 part by weight of a formaldehyde urea resin containing free aldehyde radicals and 3 parts by weight of epichlorohydrin are mixed, then heated to just below the boiling temperature of epichlorohydrin while agitating for 30 to 90 minutes, thereby producing a lignin-cellulose polyepoxy resin.

About 10 parts by weight of the lignin-cellulose polyepoxy resin, 7 parts by weight of MDI, 2 parts by weight of diethanolamine, 3 parts by weight of 1,1'-dichloroethylene and 10 parts by weight of Portland cement are thoroughly mixed. The mixture expands, then hardens to produce a rigid polyurethane foam. The foam is then wet with water to cure the cement, thereby producing a rigid polyurethane concrete foam.

EXAMPLE 19

About 3 parts by weight of the broken-down alkali metal plant polymer, as produced in Example 2a, 0.5 part by weight of phenol and 5 parts by weight of epichlorohydrin are mixed, then heated to just below the boiling temperature of epichlorohydrin while agitating for 30 to 90 minutes, thereby producing a lignin-cellulose polyepoxy resin.

About 10 parts by weight of the lignin-cellulose polyepoxy resin, 10 parts by weight of crude phosgenation product of aniline-formaldehyde condensation (MDI), 3 parts by weight of trichlorotrifluoroethane, 0.1 part by weight of a water-soluble polyester siloxine, 0.2 part by weight of sodium dioctyl sulfosuccinate, 1 part by weight of tricresylphosphate and 1 part by weight of water containing 50% silicic acid and 10% triethylamine are mixed. The mixture is then poured in a thin layer on a mold where the mixture expands to produce a rigid, tough polyurethane foam panel which may be used for insulation.

EXAMPLE 20

About equal parts by weight of epichlorohydrin and broken-down alkali metal plant polymer, as produced in Example 3d, are mixed, then heated to a temperature between ambient temperature and the boiling temperature of epichlorohydrin while agitating at ambient pressure for 30 to 90 minutes, thereby producing lignin-cellulose polyepoxy resin.

About equal parts by weight of the lignin-cellulose polyepoxy resin, Bisphenol-A, phenoxy resin and MDI are mixed at ambient temperature, thereby producing a polyurethane resinous product. The fluid mixture may be painted on wood and used as a coating agent.

EXAMPLE 21

About 10 parts by weight of the lignin-cellulose polyepoxy resin, as produced in Example 21, and 10 parts by weight of a polyepoxy compound, a glycidil polyether of 2,2'-bis(4-hydroxyphenol) propane containing at least 2 epoxy radicals per molecule and 3 parts by weight of diethylenetriamine are mixed, then about 10 parts by weight of MDI and 4 parts by weight of trichlorotrifluoroethane are admixed. The mixture begins to expand in 15 to 45 seconds and expands to produce a rigid polyurethane foam. The foam may be used for floatation in boats by pouring the mixed liquid in place or placing the foamed product in place.

EXAMPLE 22

About 100 parts by weight of the broken-down alkali metal plant polymer, as produced in Example 26, 20 parts by weight of ethylene chlorohydrin, 20 parts by weight of propylene glycol, 10 parts by weight of triethanolamine and 10 parts by weight of triethylamine are mixed, then 100 parts by weight of epichlorohydrin are slowly added while keeping the temperature below the boiling temperature of epichlorohydrin at ambient pressure while agitating for 10 to 30 minutes, thereby producing a liquid lignin-cellulose polyepoxy product.

About equal parts by weight of the lignin-cellulose polyepoxy product and MDI ("PAPI" produced by Upjohn) are mixed with 10% by weight of a trichlorotrifluoroethane, a blowing agent, percentage based on the reaction mixture. The mixture begins to expand in about 15 to 45 seconds and expands in 1 to 3 minutes to produce tack-free, tough, rigid polyurethane foam which weighs about 1.5 to 2.5 pounds per cubic foot. This polyurethane foam has many well-known uses such as sound and thermal insulation, door cores, construction components art objects, floatation in boats, etc.

EXAMPLE 23

About 100 parts by weight of the broken-down alkali metal plant polymer, as produced in Example 1k, 20 parts by weight of ethylene chlorohydrin, 50 parts by weight of propylene oxide and 100 parts by weight of epichlorohydrin are mixed, then 10 parts by weight of dimethylethanolamine and 5 parts by weight of triethylenediamine are slowly added while keeping the temperature below the boiling temperature of epichlorohydrin and agitating for 10 to 30 minutes, thereby producing a liquid lignin-cellulose polyepoxy resin.

About 10 parts by weight of the lignin-cellulose epoxy resin, 7 parts by weight of crude MDI (polyphenyl-polymethylene-isocyanates) and 2 parts by weight of trichlorotrifluoroethane are mixed. The mixture expands to produce a rigid, tough, light-brown-colored polyurethane foam.

Other epoxide compounds may be used in place of propylene oxide, such as butylene oxide, tetrahydrofuran, styrene oxide, ethylene oxide and mixtures thereof. It is preferred to use elevated pressure wherein the ethylene oxide is in a liquid state.

EXAMPLE 24

About 10 parts by weight of the lignin-cellulose polyepoxy resin, as produced in Example 7, 3 parts by weight of diethylenetriamine-linoleic acid condensation with at least 2 amine radicals per molecule, 0.5 part by weight of water, 2 parts by weight of fine silicic acid granules and 5 parts by weight of TDI are mixed at ambient temperature and pressure. The mixture begins to expand in 10 to 30 seconds, thereby producing a rigid polyurethane foam.

EXAMPLE 25

About 10 parts by weight of the lignin-cellulose polyepoxy resin, as produced in Example 7, 3 parts by weight of a liquid mercaptan-terminated liquid compound and 5 parts by weight of MDI ("PAPI 27" produced by Upjohn) are mixed at about 80° C. and poured into a mold, thereby producing a tough, solid polyurethane product.

EXAMPLE 26

About 30 parts by weight of the lignin-cellulose polyepoxy resin, as produced in Example 18, are mixed with 10 parts by weight of propylene oxide-diethylenetriamine resin with at least two amine radicals on each molecule, 5 parts by weight of trichlorotrifluoroethane, 10 parts by weight of sodium metasilicate pentahydrate and 30 parts by weight of MDI are mixed at 30° C. to 40° C. The mixture begins to expand in 15 to 45 seconds and expands to produce a rigid polyurethane silicate foam which weighs about 2 to 2.5 pounds per cubic foot. The foam may be cut into panels and used for insulation.

EXAMPLE 27

About 100 parts by weight of the broken-down alkali metal plant polymer, as produced in Example 2a, is mixed with 20 parts by weight of diethylenetriamine, then 50 parts by weight of epichlorohydrin are slowly added while agitating and keeping the temperature below the boiling temperature of epichlorohydrin for 10 to 30 minutes, thereby producing lignin-cellulose polyepoxy resin and sodium chloride.

About 50 parts by weight of the lignin-cellulose polyepoxy resin, 40 parts by weight of modified diphenylmethane diisocyanate with an isocyanate content of 23% and 10 parts by weight of trichlorotrifluoroethane are mixed. The mixture expands to produce a tough, rigid polyurethane foam which may be foamed in panels and used for insulation.

EXAMPLE 28

About 25 parts by weight of sodium metasilicate pentahydrate, 25 parts by weight of fine granular hydrate silicate and 100 parts by weight of TDI are mixed, then heated to 30° C. to 40° C. while agitating for 10 to 30 minutes, thereby producing an isocyanate-terminated polyisocyanate silicate prepolymer.

About 100 parts by weight of the isocyanate-terminated polyisocyanate silicate prepolymer, 50 parts by weight of the lignin-cellulose polyepoxy resin, as produced in Example 17, 20 parts by weight of polyethylene glycol (mol. wt. 600), 1 part by weight of triethanolamine and 10 parts by weight of trichlorotrifluoroethane are mixed at 30° C. The mixture begins to expand in 15 to 45 seconds, thereby producing a rigid polyurethane silicate foam which may be foamed in panels and used for insulation. The foam is highly flame-resistant.

EXAMPLE 29

About 25 parts by weight of potassium metasilicate pentahydrate and 100 parts by weight of MDI are mixed, then heated to 30° C. to 40° C. while agitating for 10 to 30 minutes, thereby producing an isocyanate-terminated polyisocyanate silicate prepolymer.

About 100 parts by weight of the isocyanate-terminated polyisocyanate prepolymer, 100 parts by weight of Portland cement, 50 parts by weight of lignin-cellulose polyepoxy resin, as produced in Example 23, 20 parts by weight of trichlorotrifluoroethane and 5 parts by weight of triethylamine are mixed at 24° C. The mixture begins to expand in 15 to 45 seconds, expanding to produce a rigid polyurethane silicate foam.

The rigid foam is then wet with water to cure the Portland cement.

Although specific materials and conditions were set forth in the above examples, these were merely illustrative of preferred embodiments of my invention. Various other compositions, such as the typical materials listed above may be used, where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended claims.

I claim:

1. The process for the production of polyurethane products by mixing and reacting the following components:
   A: 1 to 200 parts by weight of a lignin-cellulose polyepoxy resin which is produced by mixing and reacting 10 to 200 parts by weight of a polyfunctional epoxide compound and 50 parts by weight of broken-down alkali metal plant polymer;
   B: 50 to 100 parts by weight of a polyisocyanate or polyisothiocyanate.

2. The process of claim 1 wherein the polyfunctional epoxide compound is an epihalohydrin.

3. The process of claim 1 wherein the broken-down alkali metal plant polymer is produced by heating 1 to 3 parts by weight of alkali metal hydroxide with 2 parts by weight of plant particles while agitating at temperatures between 150° C. and 220° C. for 5 to 60 minutes.

4. The process of claim 1 wherein the polyisocyanate is selected from the group consisting of arylene polyisocyanates, alkylene polyisocyanates, phosgenation product of aniline-formaldehyde condensation and mixtures thereof.

5. The process of claim 1 wherein the polyisocyanate is selected from the group consisting of tolylene diisocyanate, phosgenation product of aniline-formaldehyde condensation and mixtures thereof.

6. The process of claim 1 wherein a polyol in the amount of up to 100 parts by weight is added with the lignin-cellulose polyepoxy resin.

7. The process of claim 1 wherein from up to 50% by weight, based on the reaction mixture, of a chemically inert blowing agent, boiling within the range of from −25° C. to 80° C., is added to the lignin-cellulose polyepoxy resin and/or polyisocyanate.

8. The process of claim 1 wherein up to 200 parts by weight of a curing agent are added with the lignin-cellulose polyepoxy resin and selected from the group consisting of water, water containing 10% to 70% by weight of an alkali metal silicate, water containing 20% to 70% by weight of silica sol, water containing 5% to 40% by weight of magnesium oxide in the form of a colloidal dispersion, alkali metal silicate selected from the group consisting of sodium silicate, potassium silicate and lithium silicate, water containing up to 70% hydraulic cement and mixtures thereof.

9. The process of claim 1 wherein up to 10 percent of a catalyst, percentage based on reactive mixture, selected from the group consisting of an amine, organic tin compound, silaamines, alkali metal alcoholates and mixtures thereof, is added with the lignin-cellulose polyepoxy resin.

10. The process of claim 1, wherein up to 20% by weight, based on the reaction mixture, of an emulsifying agent is added with the lignin-cellulose polyepoxy resin.

11. The process of claim 1, wherein up to 20% by weight, based on the reaction mixture, of a foam stabilizer is added with the lignin-cellulose polyepoxy resin.

12. The process of claim 1, wherein organic or inorganic particulate or pulverulent materials are added to the lignin-cellulose polyepoxy resin and/or polyisocyanate.

13. The product produced by the process of claim 1.

14. The product produced by the process of claim 5.

15. The process of claim 1 wherein up to 100 parts by weight of an organic compound, consisting of aldehyde, alkene halohydrin, phenol, mono-epoxy, amine, organic polyepoxy compound, organic polyhydroxy compound and mixtures thereof, are added with the broken-down alkali metal plant polymer when reacted with a polyfunctional epoxide compound to produce the lignin-cellulose polyepoxy resin.

16. The process of claim 15 wherein the aldehyde is selected from the group consisting of formaldehyde, acetoaldehyde, furfural, benzaldehyde, crotonaldehyde, acrolein, chloral, butylaldehyde and mixtures thereof.

17. The process of claim 15 wherein the alkene halohydrin has the general formula of:

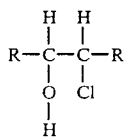

wherein R is an alkene.

18. The process of claim 15, wherein the phenol is selected from the group consisting of phenol, cresols, cresylic acid, creosote, xylenols, anacordol, p-tert-butyl phenol, p-tert-amyl-phenol, phenolic acids produced from bark and mixtures thereof.

19. The process of claim 15 wherein the amine is a tertiary amine.

20. The process of claim 16 wherein the mono-epoxy compound is selected from the group consisting of ethylene oxide, propylene oxide, butylene oxide, tetrahydrofuran, styrene oxide and mixtures thereof, and is added at a pressure wherein the mono-epoxide compound is in a liquid state.

21. The process of claim 15 wherein the organic polyepoxy is a glycidyl polyether of 2,2'-bis(4-hydroxy phenyl) propane, containing at least 2 epoxy radicals per molecule.

22. The process of claim 1 wherein up to 50 parts by weight of a polyhydroxyl compound, selected from the group consisting of di(monohydroxy) alkanes, di(monohydroxyaryl) alkanes, resorcinol, hydroquinones glycols, glycerol, trimethylol propane, polyesters with 2 or more hydroxyl groups per molecule, polyamides with 2 or more hydroxyl groups per molecule and mixtures thereof, are added with the lignin-cellulose polyepoxy resin.

23. The product produced by the process of claim 15.

24. The process of claim 1 wherein the organic polyisocyanate is reacted with a polyol to produce a liquid isocyanate-terminated polyurethane prepolymer and the polyol is added, in the ratio of 1 to 50 mols, to 50 to 99 mols of the polyisocyanate, then reacted with the lignin-cellulose polyepoxy resin.

25. The product produced by the process of claim 24.

26. The process of claim 1 wherein up to 200 parts by weight of a water-binding agent are added with the lignin-cellulose epoxy resin and/or polyisocyanate and are selected from the group consisting of hydraulic cement, burnt lime, gypsum or synthetic anhydrites, thereby producing an inorganicorganic plastic product.

27. The product produced by the process of claim 26.

28. The process of claim 1 wherein up to 20%, percentage based on the reaction mixture, of a fire-retardant agent is added to the organic polyisocyanate and/or the lignin-cellulose polyepoxy resin.

29. The process of claim 1 wherein up to 50 parts by weight of an oxidated silicon compound, selected from the group consisting of hydrated silica, silicoformic acid, alkali metal silicates and mixtures thereof, are mixed with the polyisocyanate, then heated to between 30° C. and 40° C. while agitating for 10 to 30 minutes, thereby producing an isocyanate-terminated polyisocyanate silicate prepolymer, which is then mixed and allowed to react with the lignin-cellulose polyepoxy resin, thereby producing a polyurethane silicate product.

30. The product produced by the process of claim 28.

31. The process of claim 2 wherein the epihalohydrin is epichlorohydrin.

* * * * *